United States Patent [19]
Waldman

[11] Patent Number: 5,090,358
[45] Date of Patent: Feb. 25, 1992

[54] AQUARIUM OR TERRARIUM VESSEL

[76] Inventor: Martin Waldman, P.O. Box 5473, Vandenberg, Calif. 93437

[*] Notice: The portion of the term of this patent subsequent to Nov. 6, 2007 has been disclaimed.

[21] Appl. No.: 577,210

[22] Filed: Sep. 4, 1990

Related U.S. Application Data

[63] Continuation-in-part of Ser. No. 422,987, Oct. 16, 1989, Pat. No. 4,967,694.

[51] Int. Cl.⁵ ............................................. A01K 63/00
[52] U.S. Cl. ............................................. 119/5
[58] Field of Search ............ 119/5; 47/69; 40/160; 248/310, 300, 226.1

[56] References Cited

U.S. PATENT DOCUMENTS

| | | | |
|---|---|---|---|
| 475,404 | 5/1892 | Lockmann | 119/5 |
| 1,777,944 | 10/1930 | Trovato | 119/5 |
| 1,974,068 | 9/1934 | Greensaft | 119/5 |
| 1,991,683 | 2/1935 | Kelly | 119/5 |
| 2,144,551 | 1/1939 | Skolnick | 119/5 |
| 2,709,494 | 5/1955 | Luce | 248/310 |
| 3,018,758 | 1/1962 | Arnould | 119/5 |
| 3,119,371 | 1/1964 | Zuckerman | 119/5 |
| 3,121,417 | 2/1964 | Goldman et al. | 119/5 |
| 3,276,428 | 10/1966 | Burch | 119/5 |
| 3,288,110 | 11/1966 | Goldman et al. | 119/5 |
| 3,721,212 | 3/1973 | Groth | 119/5 |
| 3,735,738 | 5/1973 | Lake | 119/5 |
| 3,769,935 | 11/1973 | Johnson | 119/5 |
| 3,874,336 | 4/1975 | Murphy | 119/5 |
| 3,942,669 | 3/1976 | Savage, Jr. | 248/310 |
| 4,136,638 | 1/1979 | Fedor | 119/5 |
| 4,353,327 | 10/1982 | Shroyer | 119/5 |
| 4,576,355 | 3/1986 | Graf | 248/225.1 |
| 4,967,694 | 11/1990 | Waldman | 119/5 |

FOREIGN PATENT DOCUMENTS

| | | |
|---|---|---|
| 2209974 | 9/1973 | Fed. Rep. of Germany . |
| 351387 | 7/1905 | France . |
| 2475375 | 8/1981 | France . |

*Primary Examiner*—Paul J. Hirsch

[57] ABSTRACT

An aquarium or terrarium includes a relatively small, lightweight integrated picture vessel intended for simple display on a vertical or horizontal surface. An open top picture reservoir has an arrangement for a removable background picture scene. Mounting means and holding means secures the picture removeability. The reservoir can be mass producible via injection molding. Typical sizes include postcard and standard photograph dimensions.

20 Claims, 3 Drawing Sheets

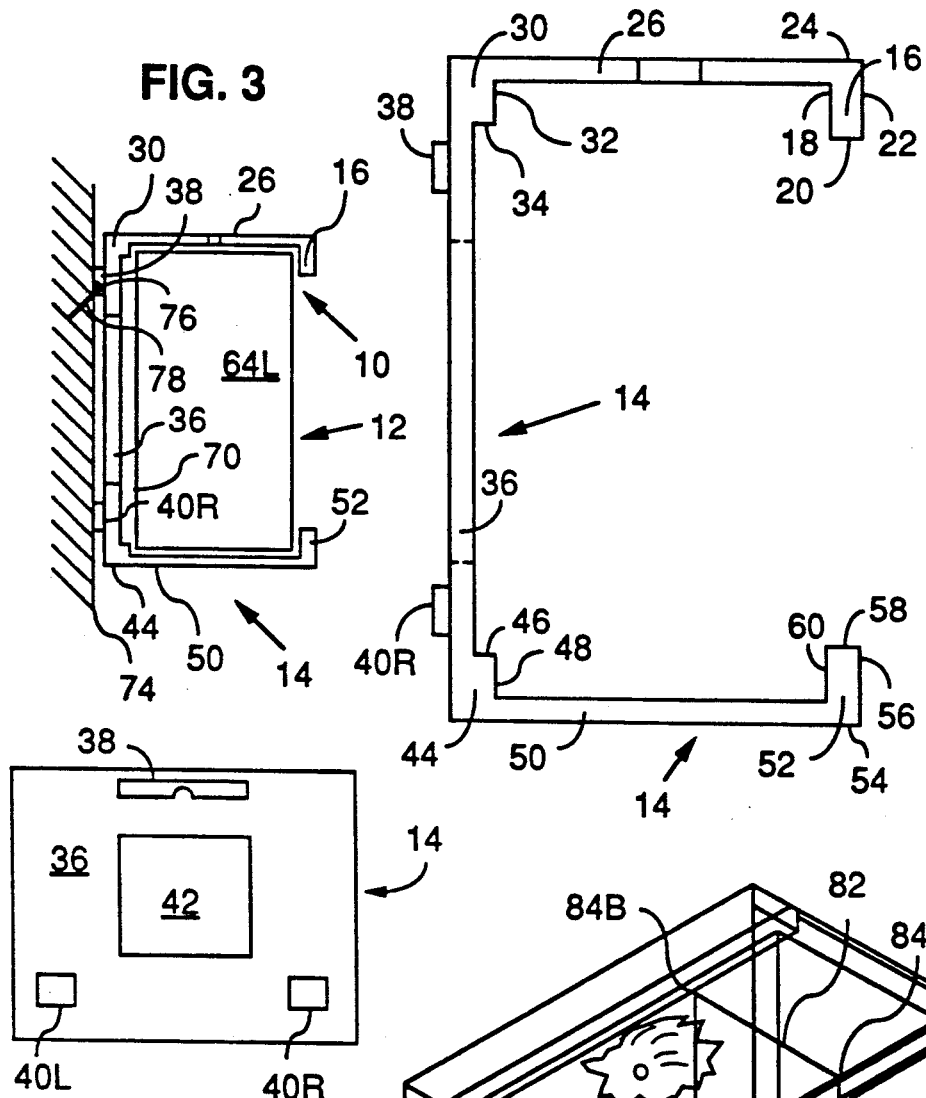
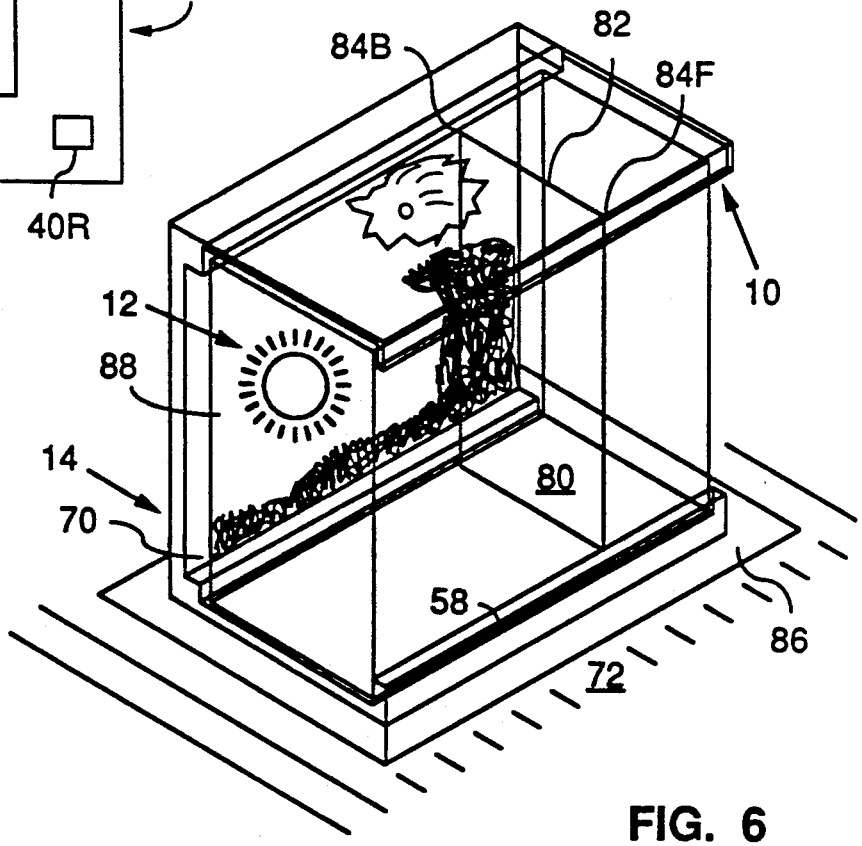

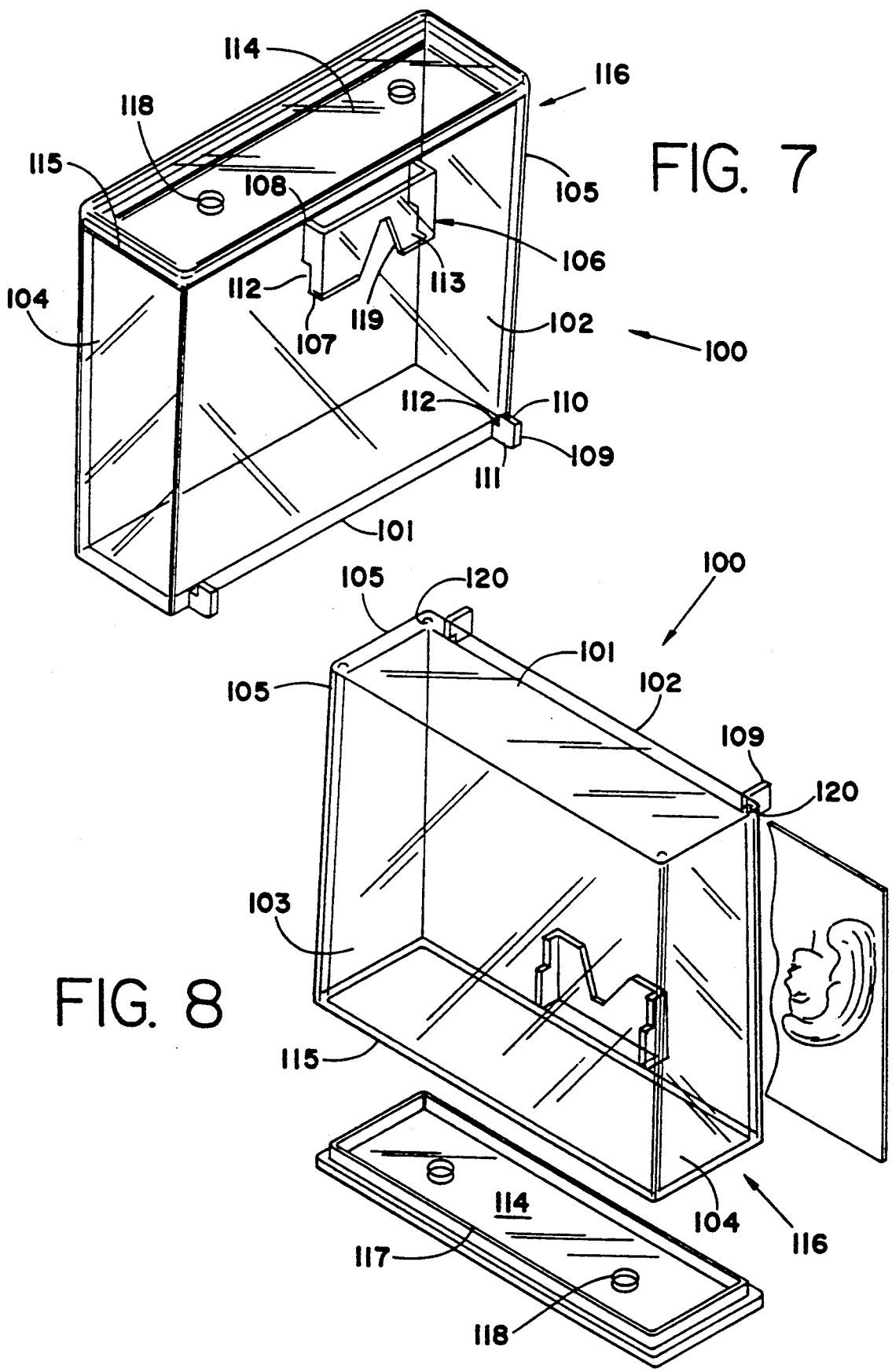

AQUARIUM OR TERRARIUM VESSEL

RELATED APPLICATION

This application is a continuation-in-part of Ser. No. 422,987 filed Oct. 16,1989 now U.S. Pat. No. 4,967,694. The contents thereof are incorporated by reference herein.

BACKGROUND

This invention relates to aquariums and terrariums and specifically to a novel manifestation of a picture background aquarium or terrarium which can be displayed on a vertical or horizontal surface.

Picture wall mount aquariums are a unique derivation of the very old basic aquarium concept, whereby one can add a special dimension to the versatility and purpose of an aquarium. By integrating the functional requirements of a terrarium into a picture wall mount aquarium, one arrives at this invention which is a combination picture wall mount aquarium and terrarium, ideally suited for either an aquarium or terrarium function.

Known picture wallmount aquariums range from hand crafted and very ornate, to handcrafted and complex, to possibly mass producible, but relatively complex and expensive. These limitations unfortunately restricted the number of people who could benefit from these past inventions. All these picture wallmount aquariums appear to be relatively difficult and awkward to wallmount, requiring a strong supportive reinforced surface and a number of nails or screws for securing the unit to a wall. It is not known to have a picture wallmount terrarium, or a combination picture wallmount aquarium and terrarium.

Known prior art picture wallmount aquariums suffer from the following disadvantages:

(a) Limitations of their design precluded their practical use on both vertical and horizontal surfaces;

(b) They were not mass producible by inexpensive methods;

(c) They were relatively cumbersome to transport, relocate and clean;

(d) They could not be displayed on a common wall surface without having a number of attach points, or at least one structural reinforcing support member behind the wall surface for attachment thereto. These mounting requirements eliminated many possible desired mounting locations, resulting in a decreased versatility of the invention;

(e) Changing of the picture scenes was a relatively complex task and the availability of appropriate, correctly sized, ready to install background scenery was limited;

(f) They could not be easily side mounted in combination with side surfaces abutted, thus limiting the possibility of many decorative or scientific uses; and (g) They were not of a sufficient design, or of a construction of adequate materials to normally withstand a matter of course fall, or tip-over event.

These complexities and shortcomings possibly explain why picture wallmount aquariums were not a success in the marketplace.

There is accordingly a need for a safely, efficiently and inexpensively found picture wallmount aquarium or a picture wallmount terrarium. There is need for a simple attractive nature which lends itself to state of the art manufacturing methods available with plastic injection molding.

SUMMARY

A vessel for housing and maintaining life, such as an aquarium or terrarium, includes a reservoir having a base, a rear wall, a front wall, and side walls between the rear wall, front wall and base. The reservoir is formed of a transparent material and can be selectively mounted on a vertical wall or mounted with the base located on a horizontal surface. There is mounting means with the rear wall whereby the reservoir can engage with a protrusion from the vertical wall. Holder means associated with the rear wall removably receives a picture, the picture having a front face and the holder means facilitating the front face of the picture in adjacency with the rear wall of the reservoir. The picture is viewable through the reservoir from the front face.

Holder means between the rear wall and an extremity of the mounting means from the rear wall holds the picture. The holder means can be part of the mounting means or a separate part of the mounting means. The holder means preferably includes components spaced apart on the rear wall and forms a slot for the picture. The mounting means is preferably integrally formed with the rear wall.

In one preferred form, a space between the rear wall and the vertical wall is preferably sufficient such that a conventional pencil or eraser at the end of a pencil can be slipped between the rear wall and the vertical wall so as to remove pictures from the holder. Components of the holder at the interface of the rear wall and the base form feet to facilitate stability of the reservoir on a horizontal surface when the reservoir is mounted horizontally.

A self-contained vessel is producible in various sizes, has a simple access for feeding fish, provides adequate ventilation to the contents of the aquarium or terrarium, and is adequately lit by ambient light. These, and all of the above positive factors, clearly define an invention which can bring the stress relieving benefits of an aquarium or a terrarium to the mass public, in the form of this combination picture wallmount aquarium or terrarium. The lightweight nature and compact size of the unit further enhances the options for display, and the benefits thereof.

The invention is further described below with reference to the accompanying drawings.

DRAWINGS

All drawings shown display the invention constructed of a clear material. It hereby follows that no hidden lines exist in these drawings, with the exception of those necessary in the side views of FIGS. 3 and 4. A description of the drawings follows:

FIG. 3 is a side elevational view of the integrated picture vessel of FIG. 1, displayed on a vertical surface.

FIG. 4 is an enlargement of the picture vessel mounting unit of FIGS. 2 and 3, which clearly defines the rails and their respective surfaces.

FIG. 5 is a rear view of the picture vessel mounting unit, clearly illustrating the configuration and locations of the vertical mount display hardware, and the access opening for removal of a background scene installed in the integrated picture vessel.

FIG. 6 is a perspective view similar to FIG. 1, which illustrates the versatility of this invention by showing it mounted in a decorative base, with a background scene and tank divider installed.

FIG. 7 is a perspective view from the rear and one side of a second embodiment in accordance with the invention showing a lid on the reservoir.

FIG. 8 is an inverted perspective view from the front and opposite side of FIG. 7 of the second embodiment showing the lid removed from the reservoir.

DESCRIPTION

Figure 1:
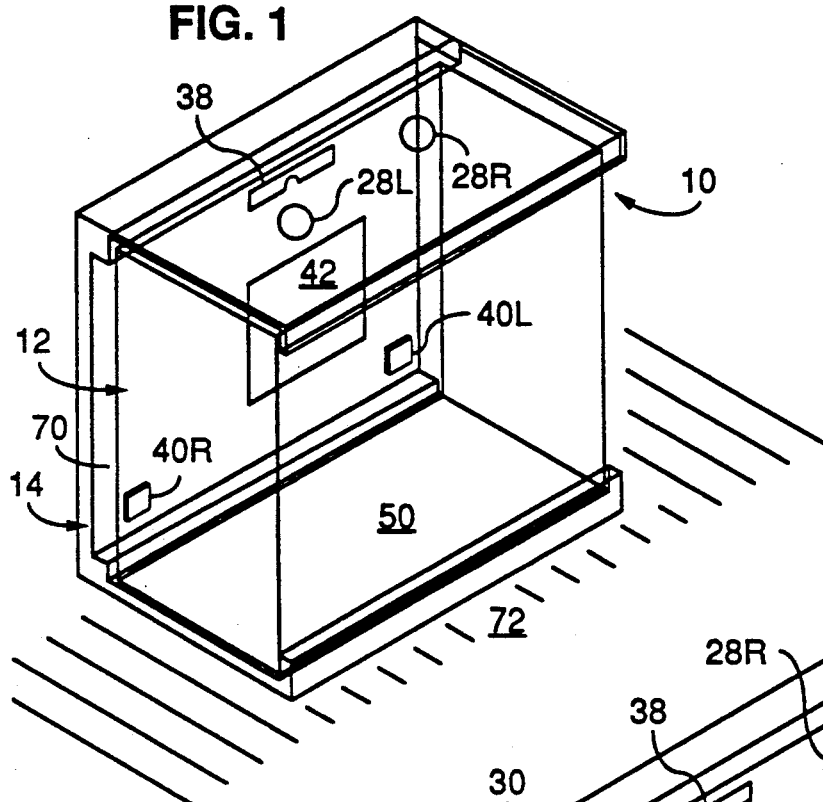
FIG. 1 is a perspective view of the integrated picture vessel displayed on a horizontal surface.

An integrated picture vessel 10 is illustrated in FIGS. 1, 3 and 6, where integrated picture vessel 10 consists of an open top picture vessel 12 and a picture vessel mounting unit 14. A background scene slot 70 is also plainly visible in FIGS. 1 and 3. In addition, a representative horizontal surface 72 is illustrated in FIGS. 1 and 6, and a representative vertical surface 74 is shown in FIG. 3.

Open top picture vessel 12 of FIGS. 1, 2, 3 and 6 is a one piece, watertight, generally injection molded component of integrated picture vessel ;0. It is defined as having interior and exterior surfaces. The interior surfaces are designed to contain a variety of appropriate compatible materials, and the exterior surfaces are designed to securely interface with vessel mounting unit 14. Clarity through the interior and exterior surfaces is required. Open top picture vessel 12 consists of a front panel 62F, a back panel 62B, a left side panel 64L, a right side panel 64R, a bottom panel 66, and an open top 68.

Picture vessel mounting unit 14 illustrated in FIGS. 1 through 6, is a one piece, generally injection molded component, consisting of interior and exterior surfaces. The interior surfaces are defined as the surfaces which directly interface with open top picture vessel 12, and a representative background scene 88. The exterior surfaces are all other surfaces which interface with the exterior environment.

A complete description of picture vessel mounting hardware 14 as detailed in FIGS. 2, 3, 4 and 5 is as follows: An upper overhang rail 16 is defined by a vertical interior rail surface 18, a horizontal exterior rail surface 20, a vertical exterior rail surface 22, and an integral horizontal exterior rail surface 24. Integral with and perpendicular to rail 16 is an open top picture vessel removable cover 26, which extends from upper overhang rail 16 flush with integral horizontal rail surface 24, to the exterior flush surface of a backplate 36. Removable cover 26 contains an air/food hole 28L and an air/food hole 28R. Situated at the interior upper rear junction of cover 26 and backplate 36 is an integrally placed upper rear rail 30. Upper rear rail 30 consists of a vertical interior rail surface 32, and a horizontal interior rail surface 34.

Figure 2:
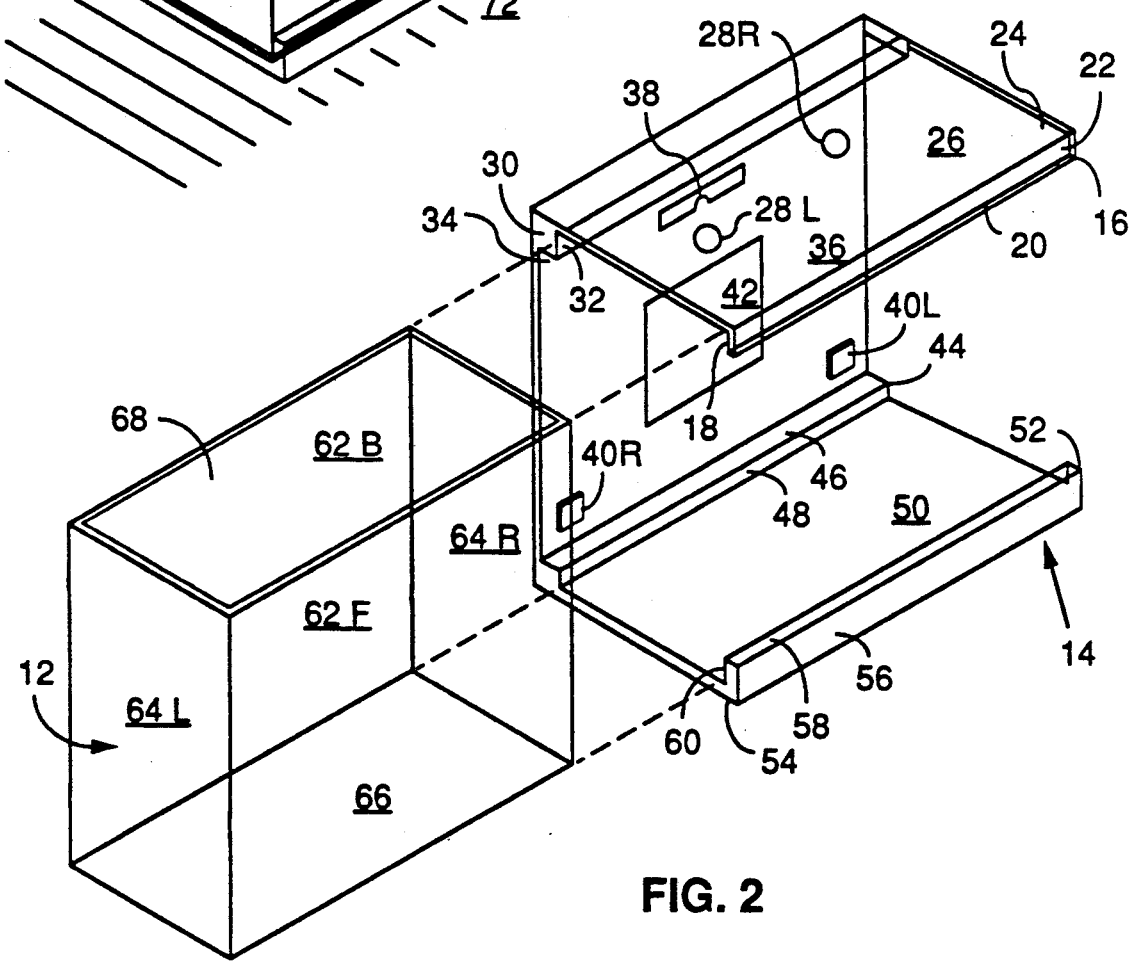
FIG. 2 is an exploded perspective view of the integrated picture vessel illustrating the two major components of the invention and the manner of assembly. On the left is the open top picture vessel, and on the right is the picture vessel mounting unit.

Backplate 36 as further detailed in FIG. 5 is a vertical member, with vertical mount suspension hardware integral to its external surface, consisting of a vertical mount suspension lip 38, a vertical mount spacer 40L and a vertical mount spacer 40R. Vertical mount spacers 40L and 40R are the same thickness as vertical mount suspension lip 38. A background scene access opening 42 is located in backplate 36. Further shown in FIGS. 2, 3 and 4 is an integrally placed lower rear rail 44 situated at the interior lower rear junction of backplate 36 and a horizontal display support member 50. Lower rear rail 44 consists of a horizontal interior rail surface 46, and a vertical interior rail surface 48. Rail 44 has the same dimensions and orientation as upper rear rail 30.

As further illustrated in FIGS. 2, 3 and 4, horizontal display support member 50 extends from the outer flush surface of backplate 36, the same dimensions and orientation as removable cover 26, ending at a lower overhang rail 52, integral and flush with an exterior horizontal rail surface 54. Rail 52 is defined by exterior horizontal rail surface 54, a vertical exterior rail surface 56, a horizontal exterior rail surface 58, an a vertical interior rail surface 60. Rail 52 has the same dimensions and orientation as upper overhang rail 16.

A fitted decorative base 86 is shown in FIG. 6. FIG. 6 also illustrates a tank divider 80, consisting of a structural reinforcer 82, an overhang bracket 84F, an overhang bracket 84B, and representative background scene 88.

From the description above, a number of advantages of this integrated picture vessel become evident:

(a) The simple design of the vertical mount suspension lip, vertical mount spacers, and the horizontal display support member provide for a simple interface with either a vertical or horizontal surface.

(b) The overall simple design of the open top picture vessel and the picture vessel mounting unit allows for their mass production via plastic injection molding. This in turn makes the integrated picture vessel inexpensive and available to the mass public, so they can reap the benefits of its use.

(c) The design, size and sturdiness of the integrated picture vessel allows for its transportation, cleaning and relocation with minimal effort.

(d) The configuration and the choice of materials which define the integrated picture vessel result in a lightweight invention, which can be utilized in practically any suitable environment on practically any table or wall.

(e) The readily accessible background slot between the open top picture vessel and the picture vessel mounting unit provides for a very simple way to install or access a background scene.

(f) The integrated picture vessel is designed for use with the inexhaustible supply of quality, ready to install background scenery available, in particular, postcards, laser prints, photographs and drawings.

(g) The versatile design of the integrated/ open top picture vessel allows for its mounting in practically any combination of ways. Multiple smaller open top picture vessels can be contained within a single picture vessel mounting unit, or whole integrated picture vessels can be sidemounted with sides abutted for special display effects or for scientific purposes.

(h) The integrated picture vessel assembly of the open top picture vessel and the picture vessel mounting unit is of an interlocking strong design. The advantages of this design are apparent in the event of a matter of course accident with the unit, where the possibility of breakage or loss of contents is greatly minimized.

Integrated picture vessel 10 of FIGS. 1, 3 and 6 is assembled from the installation of open top picture vessel 12 into picture vessel mounting unit 14. To assemble as shown in FIG. 2, open top picture vessel 12 is aligned between vertical rail surfaces 18, 32, 48 and 60, of rails 16, 30, 44 and 52, respectively. The exterior of panel 66 of open top picture vessel 12 is then slid along the interior of horizontal display support member 50, until open top picture vessel 12 is aligned within the confines of picture vessel mounting unit 14, with front panel 62F bordered by rail surfaces 20, 22, 56 and 58 as shown in FIGS. 1, 3 and 6. When properly installed, open top picture vessel 12 will be securely held in place by rail surfaces 18, 32, 48 and 60. In this configuration, open top picture vessel 12 can only be removed by pushing it along rail surfaces 18, 32, 48 and 60 with sufficient force to overcome the coefficient of friction between the exterior of panel 66 and the interior of horizontal display support member 50.

Once assembled as shown in FIGS. 1, 3 and 6, slot 70 is defined in the space between the exterior of backpanel 62B and the interior of backplate 36. Slot 70 is for placement of background scene 88 as shown in FIG. 6, having length and height dimensions consistent with he length and height dimensions of integrated picture vessel 10. The width of slot 70 is designed to be roughly two millimeters. In slot 70, background scene 88, consisting of a postcard, photograph, drawing or the like, is contained vertically between horizontal rail surfaces 34 and 46, and horizontally between the exterior surface of backpanel 62B in combination with the interior surface of backplate 36. Background scene 88 can be changed as often as desired by simply pushing it out via access opening 42, along rail surfaces 34 and 46 until it can be grasped as it emerges from either end of slot 70.

To display integrated picture vessel lo on vertical surface 74 as shown in FIG. 3, a brad type nail 78 is tapped into vertical surface 74 until roughly three quarters of a centimeter of nail 78 remains outside vertical surface 74. Integrated picture vessel 10 is then suspended on vertical surface 74, via the interlock of a head 76 of brad type nail 78 into vertical mount suspension lip 38. Spacers 40L and 40R serve to keep the integrated picture vessel 10 stable and parallel to vertical surface 74. To remove integrated picture vessel 10 from vertical surface 74, one grasps picture vessel mounting unit 14 on the outer surface of removable cover 26, and the outer surface of horizontal display support member 50. Integrated picture vessel 10 can then be easily placed on another vertical surface 74 utilizing the same procedure previously defined in this paragraph. It can also be set down on horizontal surface 72 as indicated in FIG. 1, or set level in fitted accessory base 86 as shown in FIG. 6, so horizontal surface 58 is flush with the top of base 86.

Illumination of open top picture vessel 12 interior and background scene 88 installed in slot 70 is possible with only ambient light due to the clear material used to construct open top picture vessel 12, and optionally construct picture vessel mounting hardware 14. Even if picture vessel mounting hardware 14 is constructed of a decorative color material, sufficient ambient light would still enter open top picture vessel 12 via panels 62F, 64L, and 64R to illuminate the interior of open top picture vessel 12, and background scene 88.

An adequate air supply to the contents located in the interior of open top picture vessel 12 is provided via holes 28L and 28R which are located in open top picture vessel removable cover 26 as clearly shown in FIGS. 1, 2 and 6. Holes 28L and 28R provide an adequate air supply into open top picture vessel 12 when it is used as an aquarium, for sustaining the life of air breathing fish such as Bettas. They also provide an adequate space for supplying an external forced supply of air for gill and other type fish or life, if an individual does not wish to make a structural modification to the unit. If integrated picture vessel 10 is used in the terrarium application, holes 28L and 28R provide adequate ventilation for plants requiring a moisture, oxygen and carbon dioxide cycle. Additionally, in the aquarium application of integrated picture vessel 10, holes 28L and 28R also provide a way to feed the fish without removing integrated picture vessel 10 from vertical surface 74 or disassembling on top picture vessel 12 from picture vessel mounting unit 14. Holes 28L and 28R in removable cover 26, are designed and located for equal distribution of food dropped into the water contained in the interior of open top picture vessel 12.

To add, change, or rearrange the contents of integrated picture vessel 10, one simply removes open top picture vessel 12 from picture vessel mounting unit 14 by reversing the procedure previously described, and illustrated in FIG. 2. Once separated, the individual then applies the best personal methods and tools required to accomplish the adding, changing or rearranging task at hand.

FIG. 6 illustrates how tank divider 80 can be placed in the interior of open top picture vessel 12 for segregating fish or other life as required. Tank divider 80 attaches and overhangs open top picture vessel 12 front panel 62F with bracket 84F, and real panel 62B with bracket 84B. Structural reinforcing member 82 reinforces the top of tank divider 80, which insures that brackets 84F and 84B are of a sufficient strength to adequately support tank divider 80.

In a second embodiment, the vessel for housing and maintaining life comprises a reservoir 100 having a base 101, a rear wall 102, a front wall 103 and side walls 104 and 105. The reservoir is made of a transparent thermoplastic material. Mounting means 106 is integrally formed with the rear wall 102 whereby the reservoir 100 is adapted for selective mounting on a vertical wall with the mounting means 106 engageable with a protrusion such as a nail from the vertical wall. Alternatively, the reservoir 100 is for mounting with the base 101 located on a horizontal surface. The mounting means 106 is located on the rear wall 102 towards an extremity of the wall 102 from the base 101. Essentially, the mounting means 106 is adjacent to the perimeter of the top of the reservoir 100. The mounting means 106 is a hook formation with a free end 107 directed towards the base 101. The thickened portion 108 is attached to the rear wall 102. Space to hold the means 108 and 109 are located towards the interface between the base 101 and rear wall 102. The holder means 108 and 109 are also located towards the side walls 104 and 105. Holder means 109 have hook formations 110 and a thickened portion 111 which is integrally formed with the rear wall 102. The hook formations 110 and 111 define a space 112 between the rear wall 102 and the hook formations 107 and 110, respectively. The space is sufficient for a picture to be located against the rear wall 102 in adjacency with the rear wall such that the front of the picture is visible from the front wall 103 of the reservoir 100. The holder means 109 is located between the rear wall 102 and the extremity 113, being the rear face, of the mounting means 106. In this fashion, the picture is located between that extremity of face 113 and the rear wall 102.

A lid means 114 is formed for location around the perimeter 115 of the top 116 to the reservoir 100. The lid 114 includes a peripheral lip 117 for engagement with the perimeter 115 of the top 116 of the reservoir 100. As such, the lid 114 fits with the top 116 of the reservoir at least partly in and at least partly above the perimeter of the top 116. This formation constitutes a flush location of the lid 114 on top of the reservoir 100. Apertures 118 are formed in the top of the lid at spaced locations. This permits for ventilation to the contents of the reservoir which is selectively either a aquarium or terrarium. The holder means 109 are space components adjacent to base 101 and act as feet when the reservoir 100 is located on a horizontal surface.

The reservoir 100 is formed of planar walls so that the reservoir 100 forms a cubic shape. In other circumstances, selective walls may be suitably curved. For instance, the reservoir may form a semi-circular front and a flat rear wall 102. Essentially, t he rear wall should be flat so that the picture can be located in adjacent abutment with the rear wall.

By having the hook formation 106 and holder formations 109 formed in this fashion, the reservoir 100 can be easily ejection molded. Indeed, with the hook formation 107 pointing downwardly towards the base 101, the reservoir 100 can easily be removed from an injection mould. Notch 119 formed in the hook portion 107 permits for secure location with a protruding nail or screw from a vertical wall.

The spacing of the extremity 113 from the wall 102 is sufficient that a thin object such as a conventional lead pencil or eraser at the end of a lead pencil can be inserted behind the rear wall 102 when the reservoir is located adjacent to a vertical wall. As such, a picture can be easily moved in and out of the position on the holders 109.

The picture is preferably located so that the holder permits the top of the picture to be located adjacent the extremity of the rear wall from the base, namely, the top. The sides of the picture are located adjacent the interface between the side walls and the rear walls. The bottom of the picture is located close to the interface between the rear wall and the base. The picture essentially fits over the entire rear wall 102 of the reservoir 100.

The reservoir 100 is formed with a slight taper, about 2 between the base 101 and the top 115, the top 115 being broader than the base 101. Similarly, the side walls 104 and 105 taper about 1 outwardly from the base 101 to the top 115. This construction permits for the easy removal of the reservoir 100 from the injection mould.

The integrated picture vessel defined by this invention is the embodiment of virtues which serve to make the picture wallmount aquarium or terrarium a worthwhile, inexpensive purchase for the mass public. The limitless supply of postcards and photographs available for use as background scenery illustrates the overwhelming display combinations possible with this invention.

Although the description above contains many specifications, these should not be construed as limiting the scope of the invention, but as merely providing illustrations of some of the presently preferred embodiments of this invention. For example, the integrated picture vessel could be constructed of an open top picture vessel where the picture slot and the vertical mounting hardware are permanently or semipermanently attached to the open top picture vessel, and the open top picture vessel directly rests on a horizontal surface. The material for the reservoir is a plastic such as a thermoplastic resin. In other cases suitable glass material can form the reservoir. The mounting means may have at least in part an aperture in the rear wall.

In some cases, dimple type protrusion structures 120 can be provided on the base 101 of the aquarium. These facilitate support of the aquarium and also space the base 101 slightly for any water to pass underneath the aquarium.

The scope of the invention should be determined by the appended claims and their legal equivalents.

I claim:

1. A vessel for housing and maintaining life comprising:

a reservoir having a base, a rear wall, a front wall, and sidewalls between the rear wall, front wall, and base, the reservoir being formed of a transparent material;

mounting means with the rear wall whereby the reservoir is adapted for selective mounting on a vertical wall wherein the mounting means is engageable with a protrusion from the vertical wall, or is adapted for mounting with the base located on a horizontal surface; and holder means attached to the rear wall for removably receiving a picture, a picture having a front face and the holder means positioning the front face of the picture in adjacency with the rear wall of the reservoir such that the picture is visible from the front wall through the reservoir, the holder means being between the rear wall and an extremity of the mounting means from the rear wall, and wherein the mounting means is integrally formed with the rear wall and includes part of the holder means, and including lid means for the reservoir.

2. A vessel as claimed in claim 1 wherein the holder means includes components spaced apart on the rear wall.

3. A vessel as claimed in claim 2 wherein the components form together with the rear wall a slot formation for the picture.

4. A vessel as claimed in claim 2 wherein the components have a depth thereby to space the rear wall from a vertical wall.

5. A vessel as claimed in claim 4 wherein at least two components are at the interface of the rear wall and the base, the components being spaced apart towards the side walls and being feet for the reservoir thereby to facilitate stabilization of the reservoir when located on a horizontal surface.

6. A vessel as claimed in claim 1 wherein the mounting means includes a hook formation, the hook formation being located on the rear wall in a position remote from the base and having a free end directed towards the base.

7. A vessel as claimed in claim 1 wherein the lid is separable from the reservoir.

8. A vessel as claimed in claim 1 wherein the vessel is selectively an aquarium or terrarium.

9. A vessel as claimed in claim 1 wherein the walls to the reservoir are planar.

10. A vessel as claimed in claim 9 wherein the reservoir is a cubic shape.

11. An integrated picture vessel being selectively an aquarium or terrarium and being compatible with a vertical mounting surface and a horizontal mounting surface, comprising:

(a) an open top picture vessel defined as being a combined container and a frame, having an exterior surface area and an interior surface area, a cover, and having at least one said exterior surface area which is compatible with said horizontal mounting surface, and which is constructed and sized to accommodate selectively air, water, fish, gravel, plants, soil, and being of a shape and clarity through which the contents of said open top picture vessel can be viewed in relationship to a background picture scene located in an accessible background scene holder adjacent to a surface of said exterior surface area of said open top picture vessel; and (b) a picture vessel mounting means, having an outer surface area and an inner surface area, and having at least one said inner surface area which securely interfaces with at least one said exterior surface area of said open top picture vessel, said mounting means being compatible with said exterior surface area of said open top picture vessel, and a vertical mount display means and a horizontal mount display means for securing said integrated picture vessel to said mounting surfaces; whereby the vessel may be displayed on said mounting surfaces, with said removable background picture scene.

12. The integrated picture vessel of claim 11 wherein said picture vessel mounting means contains an access opening to provide an access means for said background picture scene installation in said accessible background scene holder, and for removal of said background scene from said integrated picture vessel.

13. The integrated picture vessel of claim 12 wherein said cover is removable and contains a plurality of holes to provide an access means for food and air to enter said interior of said open top picture vessel.

14. The integrated picture vessel of claim 13 wherein said removable cover is formed of a surface which is adjacent to said picture vessel mounting means.

15. The integrated picture vessel of claim 14 wherein said integrated picture vessel is of a general rectangular shape.

16. The integrated picture vessel of claim 14 wherein said integrated picture vessel is of a cubic shape.

17. A vessel for housing and maintaining life comprising:

a reservoir having abase, a rear wall, a front wall, and sidewalls between there are all, front wall, and base, the reservoir being formed of a transparent material;

mounting means integrally formed with the rear wall whereby the reservoir is adapted for selective mounting on a vertical wall wherein the mounting means is engageable with a protrusion from the vertical wall or is adapted for mounting with the base located on a horizontal surface and the mounting means being located on the rear wall towards an extremity from the base;

holder means attached to the rear wall for removably receiving a picture the picture having a front face and the holder means positioning the front face of the picture in adjacency with the rear wall of the reservoir such that the picture is visible from the front wall through the reservoir, the holder means having spaced supports on the rear wall, the supports being located adjacent the interface of the rear wall and to base, such that the bottom of the picture can be located adjacent the rear wall interface with the base, and wherein the holder permits the top of the picture to be located substantially adjacent the extremity of the rear wall from the base, and wherein the sides of the picture being adjacent the interface of the side walls with the rear wall; and lid means for the reservoir.

18. A vessel as claimed in claim 17 wherein the mounting means forms part of the holder means, and wherein the mounting means and holder means include at least three elements spaced apart n the rear wall, the elements having formations for holding a picture in adjacency with the rear wall of the reservoir.

19. A vessel as claimed in claim 17 wherein the lid includes a peripheral lip for engagement with a top to the reservoir, and wherein the lid fits at least partly in and at least partly above the top of the reservoir.

20. A vessel for housing and maintaining life comprising:

a reservoir having a base, a rear wall, a front wall, and sidewalls between the rear wall, front wall, and base, the reservoir being formed of a transparent material;

mounting means integrally formed with the rear wall whereby the reservoir is adapted for selective mounting on a vertical wall wherein the mounting means is engageable with a protrusion from the vertical wall or is adapted for mounting with the base located on a horizontal surface; and holder means attached to the rear wall for removably receiving a picture, the picture having a front face and the holder means positioning the front face of the picture in adjacency with the rear wall of the reservoir such that the picture is visible from the front wall through the reservoir, the holder means being between the rear wall and an extremity of the mounting means from the rear wall.

* * * * *